US011275610B2

(12) United States Patent
Ranjan et al.

(10) Patent No.: US 11,275,610 B2
(45) Date of Patent: Mar. 15, 2022

(54) SYSTEMS FOR DETERMINING DELAYED OR HUNG BACKEND PROCESSES WITHIN PROCESS MANAGEMENT APPLICATIONS

(71) Applicant: BANK OF AMERICA CORPORATION, Charlotte, NC (US)

(72) Inventors: Prabhat Ranjan, Plano, TX (US); Christopher Herman Cokis, Raleigh, NC (US); Ketul Vinodchandra Joshi, Addison, TX (US); Joseph Anil Kumar Mendemu, Irving, TX (US); Manish Nahata, West Hills, CA (US); Karan Singh Negi, Maharastra (IN); Nurani Parasuraman, Irving, TX (US); Krishna Chand Paruchuri, Dallas, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 451 days.

(21) Appl. No.: 16/523,748

(22) Filed: Jul. 26, 2019

(65) Prior Publication Data
US 2021/0026683 A1    Jan. 28, 2021

(51) Int. Cl.
| G06F 9/48 | (2006.01) |
| G06F 9/30 | (2018.01) |
| G06F 11/07 | (2006.01) |
| G06F 16/23 | (2019.01) |
| G06F 9/38 | (2018.01) |

(52) U.S. Cl.
CPC .......... *G06F 9/4881* (2013.01); *G06F 9/3017* (2013.01); *G06F 9/3891* (2013.01); *G06F 11/0793* (2013.01); *G06F 16/23* (2019.01)

(58) Field of Classification Search
CPC ............ G06F 11/0706; G06F 11/0754; G06F 11/0778; G06F 11/0793; G06F 11/3006; G06F 11/302; G06F 11/3065; G06F 16/23; G06F 9/3017; G06F 9/3891; G06F 9/4881

See application file for complete search history.

(56) References Cited

U.S. PATENT DOCUMENTS

| 6,665,716 | B1 * | 12/2003 | Hirata ................. | G06F 11/3409 709/223 |
| 7,725,572 | B1 * | 5/2010 | Kautzleben ........... | H04L 67/025 709/224 |
| 2020/0226037 | A1 * | 7/2020 | Pope ........................ | G06F 9/46 |

* cited by examiner

*Primary Examiner* — Jorge A Chu Joy-Davila
(74) *Attorney, Agent, or Firm* — Moore & Van Allen PLLC; James C. Edwards (57) ABSTRACT

Monitoring backend batch processes/agents to identify currently enabled batch processes that running/executing on schedule and those that are not running/executing on schedule. In the event that currently enabled backend batch processes are identified as delayed, a delay time is determined. Such determinations are made on a regular interval, (e.g., hourly or the like), such that, reports is generated and communicated and/or a batch process status portal is updated on the regular interval to reflect the current delayed status of batch process or, in some embodiments, the current status of all of the backend batch processes currently enabled within an enterprise. Identification of backend batch processes that are currently being delayed and the associated delay time provides a basis for determining the cause(s) for the delay and possible corrective action(s), which may be implemented in conjunction with the determinations.

12 Claims, 6 Drawing Sheets

- Hyperlink to Agent Run Summary portal including detailed Listings of Batch processes/Agent that are Currently On Schedule and Delayed
- Hyperlink to Agent Run Historical Summary portal including detailed Listings of Status Batch processes/Agent for Previous X Days Total Number of Batch Proccess/Agents Currently Enabled - XX Number of Batch Proccess/Agents Currently Delayed - XX

LOB 1

| NODE | RULESET | DESCRIPTION | RUNMODE | SCHEDULE | LASTRUNTSTART | LASTRUNTFINISH | NEXTRUNTSTART | DELAY TIME (HH:MM:SS) |
|---|---|---|---|---|---|---|---|---|
| Node A | Ruleset 1 | (Text) | Advanced | Every 60s | Date/Time | | Date/Time | 1:45:35 |
| Node P | Ruleset 1 | (Text) | Advanced | Every 60s | Date/Time | | Date/Time | 1:27:14 |
| Node G | Ruleset 1 | (Text) | Advanced | Every 30s | Date/Time | | Date/Time | 1:08:52 |
| Node S | Ruleset 2 | (Text) | Advanced | Every 60s | Date/Time | | Date/Time | 0:41:55 |
| Node K | Ruleset 1 | (Text) | Advanced | Every 60s | Date/Time | | Date/Time | 0:25:05 |

LOB 2

| NODE | RULESET | DESCRIPTION | RUNMODE | SCHEDULE | LASTRUNTSTART | LASTRUNTFINISH | NEXTRUNTSTART | DELAY TIME (HH:MM:SS) |
|---|---|---|---|---|---|---|---|---|
| Node H | Ruleset 3 | (Text) | Standard | Every 120s | Date/Time | | Date/Time | 1:24:35:15 |
| Node B | Ruleset 3 | (Text) | Advanced | Every 60s | Date/Time | | Date/Time | 1:12:12 |
| Node R | Ruleset 4 | (Text) | Advanced | Every 60s | Date/Time | | Date/Time | 0:33:44 |

FIG. 6

SYSTEMS FOR DETERMINING DELAYED OR HUNG BACKEND PROCESSES WITHIN PROCESS MANAGEMENT APPLICATIONS

FIELD OF THE INVENTION

The present invention is generally related to monitoring backend batch processes and, more specifically, monitoring backend batch processes to identify which currently enabled backend batch process fail to meet a predetermined processing schedule and, when applicable, determining the duration of the delay period associated with the backend batch process that fails to meet the predetermined processing schedule.

BACKGROUND

In large enterprises many backend operations/processes occur on a regular basis, such as batch processes, otherwise referred to as "agents" or the like, which may run or otherwise be executed on an hourly basis, daily basis, a weekly basis or the like. Many of these operations may occur within a Business Process Management (BPM) platform that serves to provide a methodology for improving an enterprise's performance by managing and optimizing internal, automated processes.

Typically, a batch process is scheduled to run at a predetermined time and be completed within a predetermined time frame. In the event that the batch process is not completed within an allotted time downstream operations/processes may be affected and/or, in some instances, regulatory procedures may be violated.

In large enterprises the volume of batch processes that are enabled or otherwise run on a regular basis may be in the thousands. In such instances, if certain ones of the batch processes are up and running but are not performing optimally (i.e., not completing their respective batch run within the allotted time), it may be a cumbersome task and, often time, involve time-consuming manual observation to determine which of the batch processes are experiencing a problem or otherwise are delayed. Such delay in processing can occur for various reasons, such as, but not limited to, the agent may be "hung" (i.e., froze or otherwise stuck in a running but non-performing state), the database in which the agent operates is not performing optimally, new revisions to the agent have resulted in delay or the like.

Therefore, a need exists to develop systems, methods, computer program products and the like that monitor currently enabled backend batch processes, i.e., "agents" to determine which of the batch processes are currently executing on schedule and which of the batch processes are not currently executing on schedule (i.e., which of the batch processes are currently delayed). In addition, a need exists, in those instances in which a batch process is determined to be not currently executing on schedule, to determine the amount of the delay, so that further analysis can determine the reason for the delay (i.e., determine if the backend process/agent is "hung" or if other reasons are causing the delay). Further, a need exists to identify backend batch process delay, as it occurs, so that remedial actions may be implemented, in real-time, to alleviate or correct the delay so that the effect on downstream operations/processes is lessened or, in some instances, eliminated.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing systems, methods, computer program product and/or the like that monitor backend batch processes, otherwise referred to as "agents" to identify currently enabled backend batch processes that are not running/executing on schedule (i.e., fail to meet a predetermined processing schedule). If a currently enabled backend batch process is identified as not running/executing on schedule, a delay time is determined. The invention provides for such identifications and determinations to made on a regular interval, (e.g., hourly or the like), such that, reports may be generated and communicated and/or a batch process status portal may be updated on the regular interval to reflect the current status of all of the backend batch processes currently enabled within an enterprise. In this regard, the present invention is able to identify backend batch processes that are currently being delayed so that, identification of the cause(s) for the delay can occur, in some instance in real-time, and corrective action(s) identified and implemented.

In specific embodiments of the invention, a backend batch process may be identified as delayed based on the last-in-time run/execution of the batch process having not been completed and the next-in-time scheduled run/execution being earlier than the current time. In such embodiments of the invention the delay period may be defined/determined as the difference between the current time and the next-in-time scheduled run/execution time. The delay period is instrumental in determining whether the batch process is a "hung" process or whether the delay can be attributed to one or more other factors (e.g., database functionality, newly implemented agent revisions or the like).

A system for monitoring status of backend batch processes defines first embodiments of the invention. The system includes a plurality of backend batch processes, each of the backend batch processes are configured to be executed on a predetermined processing schedule. The system additionally includes a computing platform having a memory, and at least one processor in communication with the memory. The at least one processor is configured to execute instructions to monitor the plurality of backend batch processes, and in response to monitoring, store, in a database, data indicating a status of enabled backend batch processes. The instructions are further configured to access the database, on a predetermined interval, to identify which currently enabled backend batch processes (i) meet the predetermined processing schedule and (ii) fail to meet the predetermined processing schedule, and generate, for the predetermined interval, at least one chosen from the group comprising a report and an update to a batch process status portal. The report and the batch process status portal indicate at least which currently enabled backend batch processes fail to meet the predetermined processing schedule.

In specific embodiments of the system, the data indicating a status includes a first start time for a last-in-time run and a second start time for a next-in-time run for executing each of the currently enabled backend batch processes. In such embodiments of the system, the instructions configured to identify are further configured to identify a currently enabled backend batch process fails to meet the predetermined processing schedule based on (i) the last-in-time run having not been completed, and (ii) the second start time is prior to a current time.

In still further specific embodiments of system, the instructions are further configured to determine a current delay period for the currently enabled backend batch process that fails to meet the predetermined processing schedule by subtracting the second start time for the next-in-time run from the current time.

In additional specific embodiments of the system, the instructions configured to generate are further configured to generate the report and the update to the batch process status portal that indicates, for each currently enabled backend batch process, the first state time for the last-in-time run and the second start-time for the a second start time for a next-in-time. In other related embodiments of the system, the instructions configured to generate are further configured to generate the report and the update to the batch process status portal that indicates, for each currently enabled backend batch process that fails to meet the predetermined processing schedule, the current delay period.

In further specific embodiments of the system the instructions configured to monitor, store and identify are further configured to connect to backend batch processes and use mBeans to retrieve run-time XML data, convert the XML data into structured data, store the structured data in a relational database, and retrieve, at the predetermined interval, the structured data from the relational database to identify which currently enabled backend batch processes (i) meet the predetermined processing schedule and (ii) fail to meet the predetermined processing schedule and generate the report and the update to the backend process status portal.

Moreover, in further specific embodiments of the system, the instructions are further configured to convert the second start time for the next-in-time run and the current time to an epoch value prior to subtracting the second start time for the next-in-time run from the current time.

In yet other specific embodiments of the system, the instructions are further configured to analyze the backend batch processes determined to have failed to meet the predetermined processing schedule to determine whether the backend batch process is a hung process.

Additionally, in other specific embodiments of the system, the instructions are further configured to analyze the backend batch processes determined to have failed to meet the predetermined processing schedule to determine a cause for the failure to meet the predetermined processing schedule. In related embodiments of the system, the instructions are further configured to determine, for the backend batch processes determined to have failed to meet the predetermined processing schedule, one or more corrective actions, and implement at least a portion of the one or more determined corrective actions.

A computer-implemented method for monitoring status of backend batch processes defines second embodiments of the invention. The method is executed by one or more computing processor devices and includes monitoring a plurality of currently enabled backend batch processes and, in response to monitoring, storing, in a database, data indicating a status of enabled backend batch processes. The method further includes accessing the database, on a predetermined interval, to identify which currently enabled backend batch processes (i) meet the predetermined processing schedule and (ii) fail to meet the predetermined processing schedule. The method additionally includes generating, for the predetermined interval, at least one chosen from the group comprising a report and an update to a batch process status portal, wherein the report and the batch process status portal indicate at least which currently enabled backend batch processes fail to meet the predetermined processing schedule.

In specific embodiments of the method the data includes a first start time for a last-in-time run and a second start time for a next-in-time run for executing each of the currently enabled backend batch processes. In such embodiments of the method identifying further includes identifying a currently enabled backend batch process fails to meet the predetermined processing schedule based on (i) the last-in-time run having not been completed, and (ii) the second start time is prior to a current time.

In further specific embodiments the method includes determining a current delay period for the currently enabled backend batch process that fails to meet the predetermined processing schedule by subtracting the second start time for the next-in-time run from the current time.

In additional specific embodiments of the method generating further includes generating the report and the update to the batch process status portal that indicates, for each currently enabled backend batch process, the first state time for the last-in-time run, the second start-time for the a second start time for a next-in-time and, for each currently enabled backend batch process that fails to meet the predetermined processing schedule, the current delay period.

Moreover, in other specific embodiments the method includes analyzing the backend batch processes determined to have failed to meet the predetermined processing schedule to determine whether the backend batch process is a hung process.

In yet further specific embodiments the method includes analyzing currently enabled backend batch processes that have been determined to have failed to meet the predetermined processing schedule to determine a cause for the failure to meet the predetermined processing schedule, determining one or more corrective actions for addressing the cause, and implementing at least a portion of the one or more determined corrective action.

A computer program product including a non-transitory computer-readable medium defines a first set of codes for causing a computer to monitor a plurality of currently enabled backend batch processes and a second set of codes for causing a computer to, in response to monitoring, store, in a database, data indicating a status of enabled backend batch processes. The computer-readable medium additionally includes a third of codes for causing a computer to access the database, on a predetermined interval, to identify which currently enabled backend batch processes (i) meet the predetermined processing schedule and (ii) fail to meet the predetermined processing schedule. In addition, the computer-readable medium includes a fourth set of codes causing a computer to generate, for the predetermined interval, at least one chosen from the group comprising a report and an update to a batch process status portal. The report and the batch process status portal indicate at least which currently enabled backend batch processes fail to meet the predetermined processing schedule.

In specific embodiments of the computer program product the data includes a first start time for a last-in-time run and a second start time for a next-in-time run for executing each of the currently enabled backend batch processes. In such embodiments of the computer program product the third set of codes is further configured to identify the currently enabled backend batch process that fails to meet the predetermined processing schedule based on (i) the last-in-time run having not been completed, and (ii) the second start time is prior to a current time.

In further specific embodiments the computer program product includes a fifth set of codes for causing a computer to determine a current delay period for the currently enabled backend batch process that fails to meet the predetermined processing schedule by subtracting the second start time for the next-in-time run from the current time.

In other specific embodiments of the computer program product the fourth set of codes is further configured to generate the report and update to the batch process status portal that indicates, for each currently enabled backend batch process, the first state time for the last-in-time run, the second start-time for the a second start time for a next-in-time and, for each currently enabled backend batch process that fails to meet the predetermined processing schedule, the current delay period.

Thus, according to embodiments of the invention, which will be discussed in greater detail below, the present invention provides for monitoring backend batch processes, otherwise referred to as "agents" to identify which of the enabled backend batch processes are running/executing on schedule and which are not running/executing on schedule. In the event that currently enabled backend batch processes are determined to not be running/executing on schedule (i.e., are delayed), a delay time is determined. The invention provides for such determinations to made on a regular interval, (e.g., hourly or the like), such that, reports may be generated and communicated and/or a batch process status portal may be updated on the regular interval to reflect at least the current status of batch processes identified as delayed and, in some instances, the current status of all of the backend batch processes currently enabled within an enterprise. In this regard, the present invention can identify backend batch processes that are currently being delayed so that, identification of the cause(s) for the delay can occur, in some instances in real-time, and corrective action(s) identified and implemented.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the disclosure in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, systems, methods and computer program products are disclosed that monitor backend batch processes, otherwise referred to as "agents" to identify those currently enabled backend batch processes that are not running/executing on schedule (i.e., fail to meet a predetermined processing schedule). If a currently enabled backend batch process is identified as not running/executing on schedule, a delay time is determined. The invention provides for such determinations to made on a regular interval, (e.g., hourly or the like), such that, reports may be generated and communicated and/or a user batch process status portal may be updated on the regular interval to reflect the current status of delayed batch processes and, in some embodiments of the invention, all of the backend batch processes currently enabled within an enterprise. In this regard, the present invention can identify backend batch processes that are currently being delayed so that, identification of the cause(s) for the delay can occur, in some instance in real-time and corrective action(s) identified and implemented.

In specific embodiments of the invention, a backend batch process may be identified as delayed based on the last-in-time run/execution of the batch process having not been completed and the next-in-time scheduled run/execution being earlier than the current time. In such embodiments of the invention the delay period may be defined/determined as the difference between the current time and the next-in-time scheduled run/execution time. The delay period is instrumental in determining whether the batch process is a "hung" process or whether the delay can be attributed to one or more other factors (e.g., database functionality, newly implemented agent revisions or the like).

In specific embodiments of the invention, the backend batch process is associated with a BPM application, such as PEGA, available from Pegasystems of Cambridge, Mass. or the like. PEGA operates within an open-source environment, such as a Linux operating system. PEGA is a Java-based application that includes mBeans, which are managed Java objects. In terms of the present invention, the mBeans manage data associated with the backend process/agent. In this regard, the present invention may use the mBeans to read and retrieve run-time XML data within the back-end process (including last-in-time run/execution time, next-in-time run execution time and the like), convert the XML data into structured data, store the structured data in a relational database. The structured data in the relational database is the basis for determining delay periods and generating and presentating the data within a report and/or batch process status portal. In other specific embodiments of the invention, the current time and the next-in-time run/execution time are converted from a numerical format to an epoch value in order to precisely calculate the delay time in terms of hours, minutes and seconds.

Figure 1:
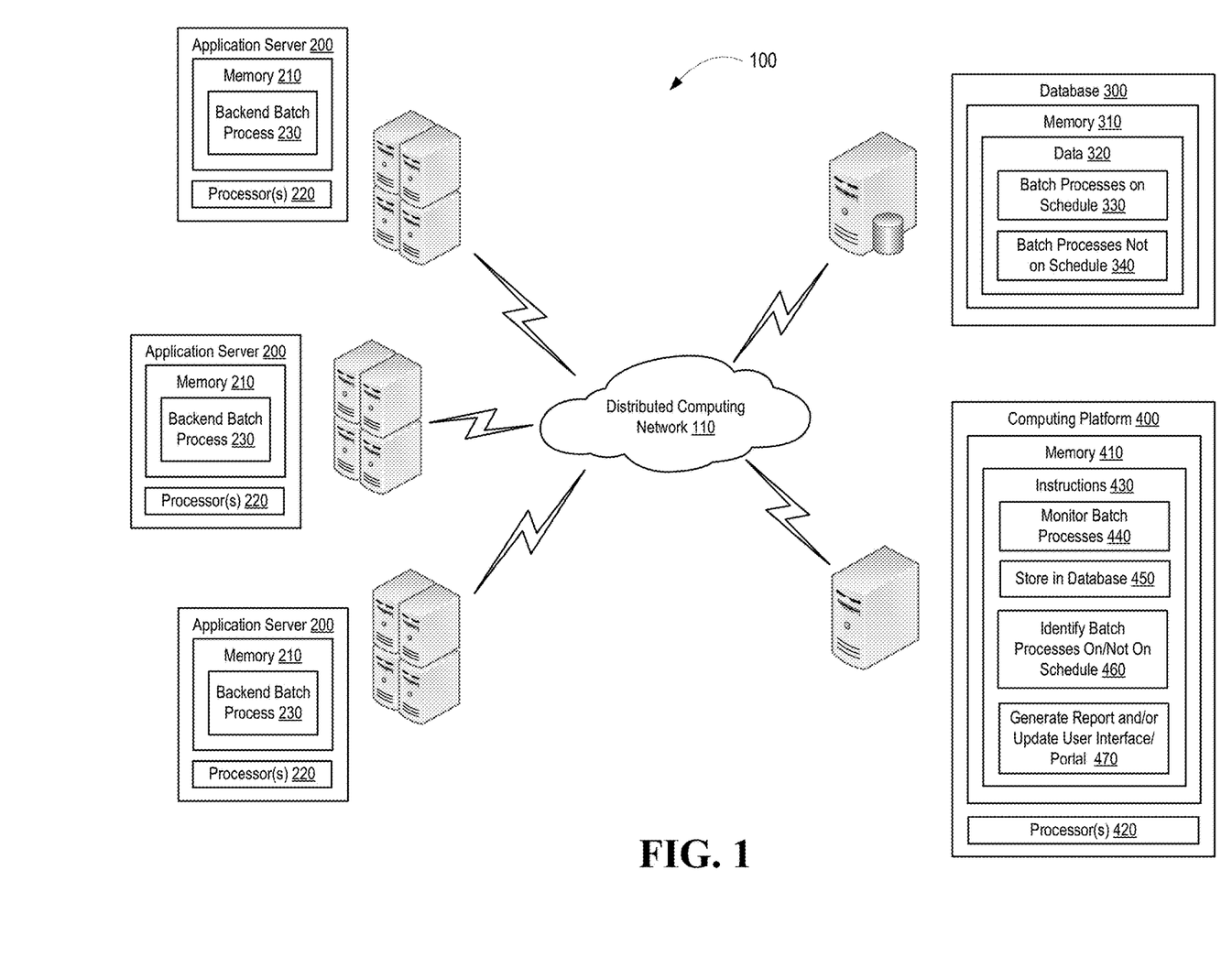
FIG. 1 is a schematic diagram of a system for determining delayed or hung backend batch processes associated with process management applications, in accordance with some embodiments of the present disclosure.

Turning now to the figures, FIG. 1 illustrates a system 100 for determining delayed and/or hung backend batch process associated with process management applications, such as BPM applications (e.g., PEGA, available from Pegasystems of Cambridge, Mass.), in accordance with embodiments of the present invention. The system 100 is implemented in a distributed computing network 110, which may include the Internet, one or more intranets or a combination of the Internet and one or more intranets. The system additionally includes a plurality of backend batch processes 230 that are stored in the memory 210 of a plurality of application servers 200 or the like. As previously mentioned, in specific embodiments of the invention, the backend batch processes may be associated with a specific BPM application, such as PEGA or the like. The backend batch processes 230, which are executable by processors 220, are configured to run (i.e., be executed) on a predetermined processing schedule. The processing schedule may comprise start times defined in terms of a date, an hour, minutes, seconds or the like.

The system 100 additionally includes database 300 that is configured to store 330, in memory 310, data 330 that indicates the status of the batch processes 230. Specifically, the database includes data 330 that indicates which of the batch processes 230 are currently on schedule 340 (i.e., meet the predetermined processing schedule designated for the batch process 230) and which of the batch processes 230 are currently not on schedule (i.e., fail to meet the predetermined processing schedule designated for the batch process). In addition, database 300 stores data 330 that indicates the historical status of batch processes.

The system 100 additionally includes computing platform 400 having a memory 410 and at least processor 420 in communication with memory 410. The memory 410 stores instructions 430 that are executable by the processor(s) 420. The instructions 430 are configured to monitor 440 the batch processes 230 and, in response to monitoring 440, store 450, in database 300, data 330 indicating a status of each of the plurality of batch processes 230. The data may include, but is not limited to, a last-in-time start time, a next-in time start time and, where applicable, a finish time for the last-in-time run.

The instructions are further configured to access the database 300, on a predetermined interval, to identify 460 which currently enabled backend batch processes (i) meet the predetermined processing schedule (i.e., on schedule) and (ii) fail to meet the predetermined processing schedule (i.e., not on schedule). In specific embodiments of the invention, the identification is based on a last-in-time start time, a next-in time start time and, whether the batch process indicates a finish time for the last-in-time run. In those embodiments in which the batch process is identified as delayed, a duration of the delay period may be determined.

The instructions are further configured to generate, for the predetermined interval, a report and/or an update to a batch process status portal. The report and/or the update to the batch process status portal indicate at least which currently enabled backend batch processes 230 fail to meet the predetermined processing schedule and, in some embodiments the current status of all the plurality of batch processes 230.

Figure 2:
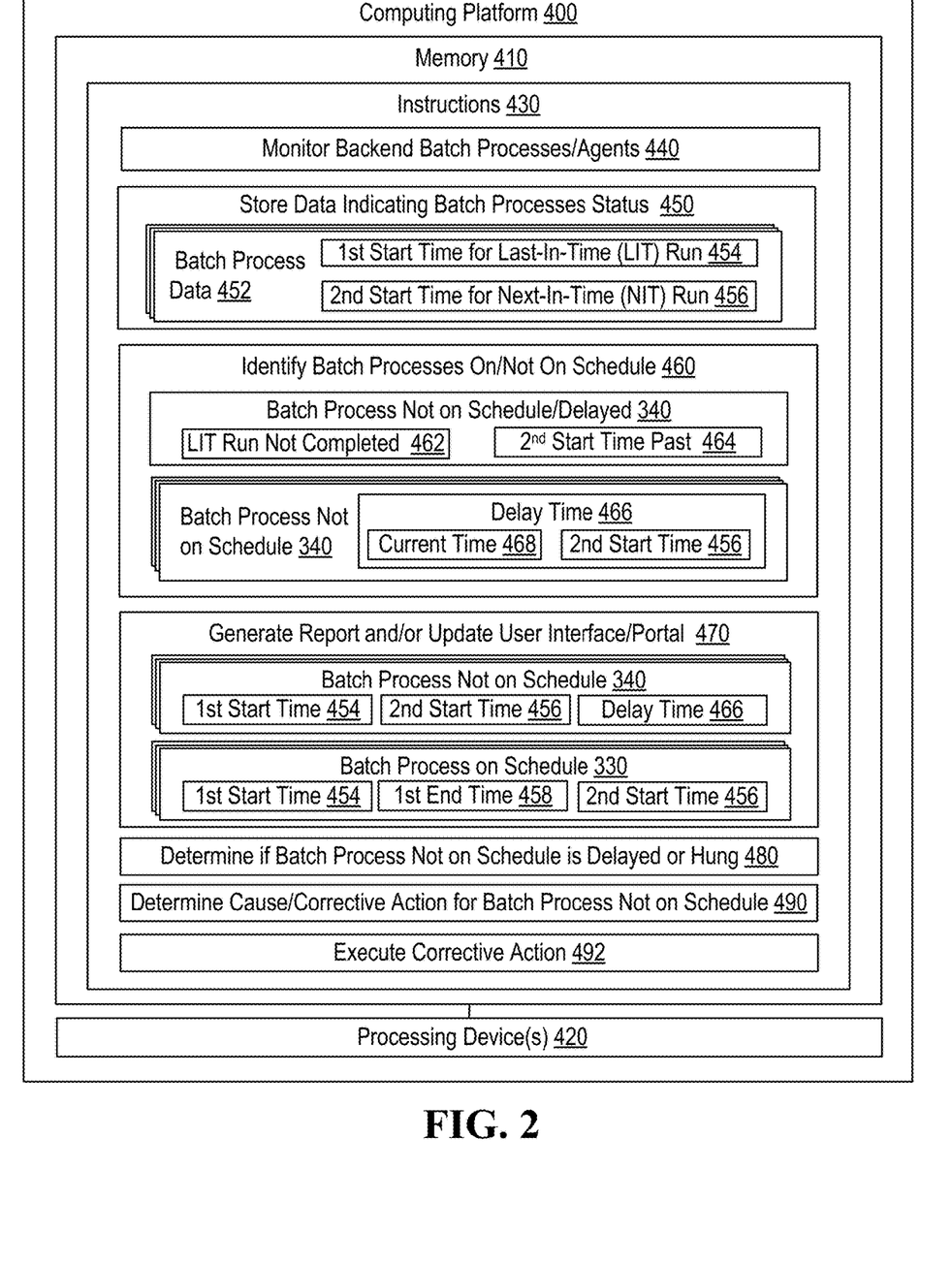
FIG. 2 is a schematic diagram of a computing platform including instructions configured for determining delayed or hung backend batch processes associated with process management applications, in accordance with some embodiments of the present disclosure.

Referring to FIG. 2 a block diagram is depicted of the computing platform 400 having instructions for determining delayed or hung backend batch processes associated with a process management process application, in accordance with embodiments of the present invention. Computing platform 400, which may comprise one or more computing devices (e.g., servers or the like), is configured to execute instructions 430, such as algorithms, modules, routines, applications and the like. Computing platform 400 includes memory 410, which may comprise volatile and non-volatile memory, such as read-only and/or random-access memory (RAM and ROM), EPROM, EEPROM, flash cards, or any memory common to computing platforms). Moreover, memory 400 may comprise cloud storage, such as provided by a cloud storage service and/or a cloud connection service.

Further, computing platform 400 also includes at least one processing device 420, which may be an application-specific integrated circuit ("ASIC"), or other chipset, logic circuit, or other data processing device. Processing device(s) 420 may execute one or more application programming interface (APIs) (not shown in FIG. 2) that interface with any resident programs, such as instructions 430 or the like, stored in the memory 410 of the computing platform 400 and any external programs. Processing devices(s) 420 may include various processing subsystems (not shown in FIG. 2) embodied in hardware, firmware, software, and combinations thereof, that enable the functionality of computing platform 400 and the operability of the computing platform 400 on the distributed computing network 110 (shown in FIG. 1). For example, processing subsystems allow for initiating and maintaining communications and exchanging data with other networked devices. For the disclosed aspects, processing subsystems of processing device 420 may include any subsystem used in conjunction with instructions 430 and related tools, routines, sub-routines, algorithms, sub-algorithms, sub-modules thereof.

Computing platform 400 may additionally include a communications module (not shown in FIG. 2) embodied in hardware, firmware, software, and combinations thereof, that enables electronic communications between the computing platform 400 and other network devices. Thus, communication module may include the requisite hardware, firmware, software and/or combinations thereof for establishing and maintaining a network communication connection with one or more network devices.

Memory 410 of computing platform 400 stores instructions 430 that are configured to monitor 440 back-end batch process 230. In specific embodiments of the invention, in which the backend batch processes are BPM application batch processes, such as PEGA batch processes or the like, monitoring may connect to a deployment manager (dmgr) via Websphere within the batch process 230 either on a continuous basis or at predetermined intervals to read and retrieve applicable data. In specific embodiments of the invention in which the batch processes are PEGA batch processes, XML data is managed by mBeans (i.e., managed JAVA data objects), which serve to read and retrieve applicable data.

Instructions 430 are further configured to store 450, in a relational database, data 452 that indicates a status of the currently enabled backend batch processes 230. In specific embodiments of the invention, in which the data 452 retrieved from the batch processes is unstructured data, such as XML data or the like, the data is converted to structured data, using shell scripts or the like, prior to storing the data in the relational database. The centralized data retrieval and storage of the present invention provides for efficiency in identifying the status of batch processes in environments in which numerous different batch processes are being executed on various virtual and/or physical machines/devices. The data may include, but is not limited to, for each backend batch process 230 a last-in-time start time 454 (designated as the first start time) and a next-in-time start time 456 (designated as the second start time) and, when applicable, a finish time for the last-in-time run 458.

In addition, instructions 430 are further configured to access the database, on a predetermined interval (such as hourly or the like) and identify which currently enabled backend batch processes (i) meet the predetermined processing schedule (i.e., on schedule), which batch processes (ii) fail to meet the predetermined processing schedule (i.e., not on schedule). In specific embodiments of the invention, batch processes identified as failing to meet the predetermined processing scheduled are identified based on the last-in-time run having not been completed 462 (i.e., last-in-time run is still executing as evident by the lack of finish time for the last-in-time run) and the next-in-time run time (i.e., second start time 456) is a past time 464 (i.e., earlier than the current time). In addition, the instructions 430 may determine a delay time 466 for the batch processes identified as having failed to meet the predetermined processing schedule 350 (i.e., not on schedule). According to embodiments of the invention, the delay time may be defined as the difference between the current time 468 and the next-in-time run time (i.e., second start time 456). In specific embodiments of the invention, determination of the delay time includes converting numerical values for the current time and/or next-in-time run time to epoch values in order to result in a time unit of hours, minutes and seconds.

Further, instructions 430 are configured to generate 470, for the predetermined interval, a report and/or an update to a web-based batch process status portal that indicates, at the least, the batch processes that currently fail to meet the predetermined processing schedule (i.e., batch processes not on schedule 350). The report and/or portal may include, but is not limited to, for each batch process identified as failing to meet the predetermined processing schedule, the last-in-time start time (i.e., first start time 454), the next-in-time start time (i.e., second start time) and the delay time 466. The report and/or portal may include, but is not limited to, for each batch process identified as meeting the predetermined processing schedule, the last-in-time start time (i.e., first start time 454), the finish time for the last-in-time run, (i.e., first end time 458), and the next-in-time start time (i.e., second start time).

In optional embodiments of the invention, the instructions 430 are further configured to analyze those batch processes identified as failing to meet the predetermined processing schedule to determine 480 whether the batch process is a delayed process (i.e., still actually executing) or a hung process (i.e., not responding/unexecuting process). The determination may take into the length of the delay time 466 in comparison to the time between batch process runs.

In other optional embodiments of the invention, the instructions 430 are further configured to analyze those batch processes identified as failing to meet the predetermined processing schedule to determine 490 a cause and/or corrective actions for addressing the delay. Such a determination may involve retrieving further data from the batch process, implementing machine learning techniques which rely on data associated with previously experienced delays and the like. In related embodiments of the invention, the instructions are further configured to execute/implement 492 at least a portion of the corrective action (i.e., auto correct the delayed or hung batch process). For example, if the batch process is determined to be hung, the corrective action of re-starting the process may occur automatically or if a database associated with the process is down or malfunctioning, the corrective action may be to move to a backup database or the like to complete the execution of the run.

Figure 3:
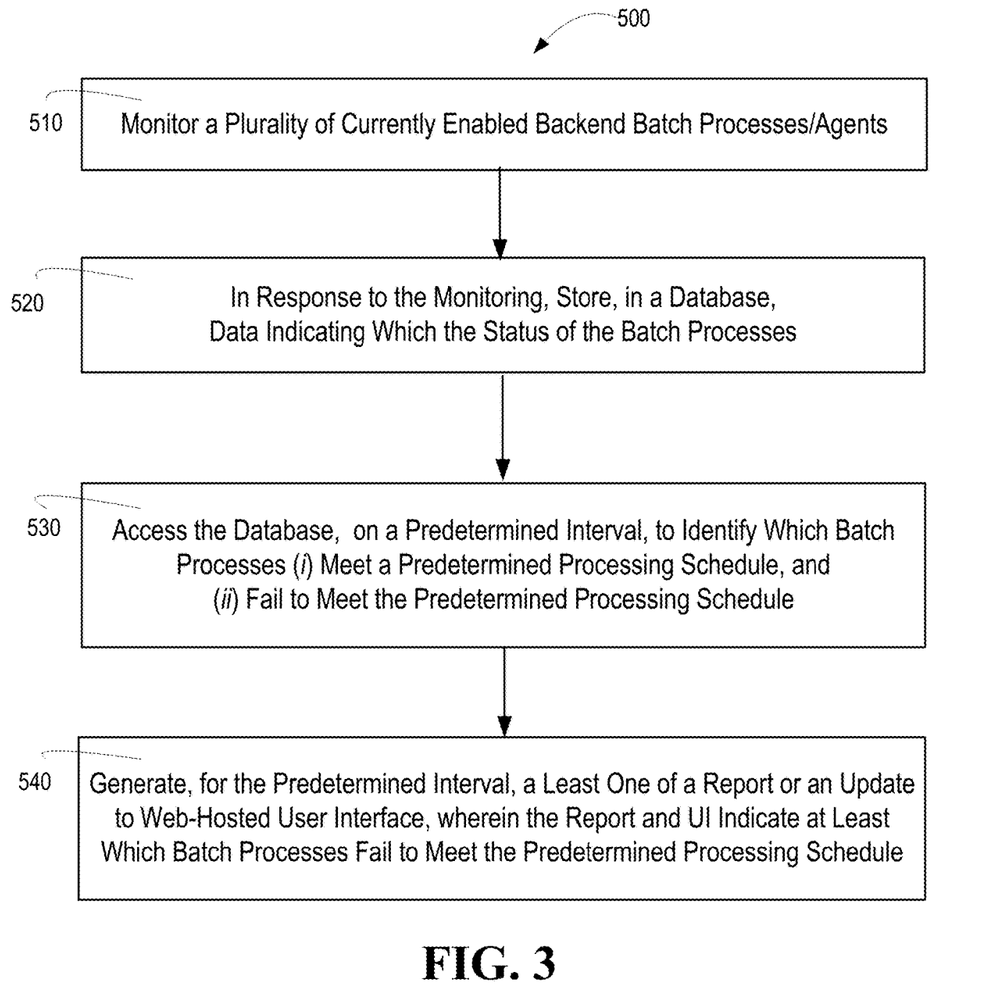
FIG. 3 is a flow diagram of a method for determining delayed or hung backend batch processes associated with process management applications, in accordance with embodiment of the present invention.

Referring to FIG. 3, a flow diagram is presented of a method 500 for determining delayed or hung batch processes associated with process management applications, in accordance with embodiments of the present invention. At Event 510, a plurality of backend batch processes are monitored. In specific embodiments of the method, the plurality of backend batch processes are some, if not all, of the batch processes associated with a specific BPM application, such as PEGA or the like. The monitoring may include continuously or on a predetermined schedule, retrieving data from the backend processes that is indicative of the status of the batch processes.

At Event 520, in response to the monitoring, data is stored, in relational database that indicates a status of each of the plurality of batch processes. The data may include, but is not limited to, a last-in-time start time, a next-in time start time and, where applicable, a finish time for the last-in-time run. As previously discussed, in specific embodiments of the invention, the data retrieved from the batch processes may be unstructured data (e.g., XML data or the like) that requires conversion to structured data prior to storing the data in the database. In such embodiments of the method, shell scripts and the like may be implemented to convert the data to structured data.

At Event 530, the database is accessed, on a predetermined interval, to identify which currently enabled backend batch processes (i) meet the predetermined processing schedule (i.e., on schedule) and (ii) fail to meet the predetermined processing schedule (i.e., not on schedule). In specific embodiments of the invention, the identification is based on a last-in-time start time, a next-in time start time and, whether the batch process indicates a finish time for the last-in-time run. In those embodiments in which the batch process is identified as delayed, a duration of the delay period may be determined as defined by the difference between the current time and the a next-in time start time.

At Event 540, a report and/or an update to batch process status portal is generated, for the predetermined interval. The report and/or an update to a batch process status portal indicates, at least, which currently enabled backend batch processes fail to meet the predetermined processing schedule and, in some embodiments of the method, the report and/or update to the portal indicate the current status of all the of the batch processes. For currently enabled backend batch processes identified as failing to meet the predetermined processing schedule the report and/or portal update may include, but is not limited to, the start time of the last-in-time run, the start time of the next-in-time run and the delay period. For currently enabled backend batch processes identified as failing to meet the predetermined processing schedule the report and/or portal update may include, but is not limited to, the start time of the last-in-time run, the finish time of the last-in-time run and the start time of the next-in-time run.

Figure 4:
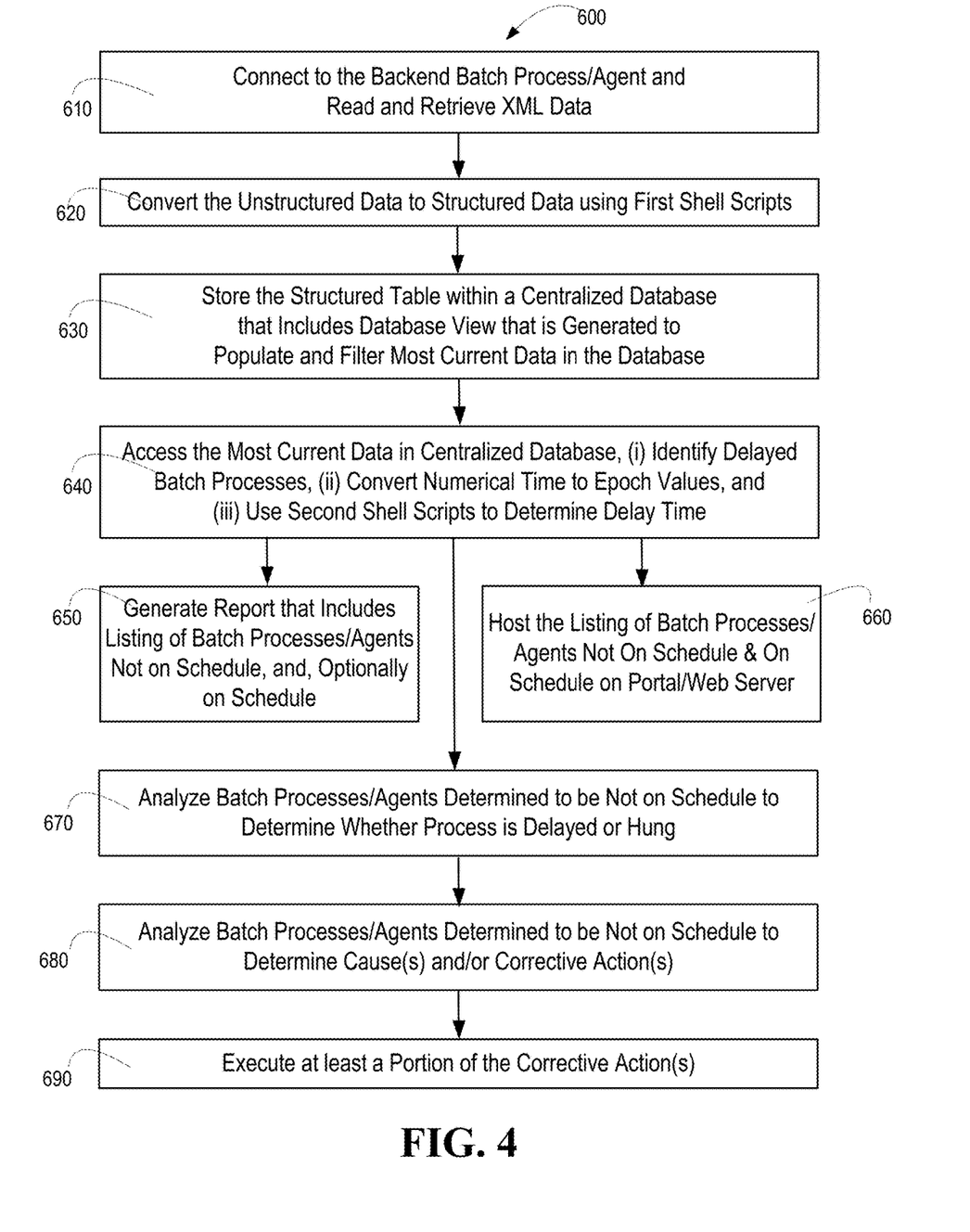
FIG. 4 is a flow diagram of a method for determining delayed or hung backend batch processes associated with process management applications, in accordance with some embodiments of the present disclosure.

Referring to FIG. 4, depicted is a method 600 for determining delayed or hung backend batch processes associated with BPM applications, in accordance with embodiments of the present invention. At Event 610, the backend batch process/agent is connected to read and retrieve data. In specific embodiments of the invention, the batch process/agents are connected to Websphere/deployment manager (dmgr) and the XML data is read and retrieved using mBeans. At Event 610, the unstructured data retrieved from the batch processes/agents is converted to structure data. In specific embodiments of the invention, shell scripts and/or a general-purpose programming language, such as Python™ may be used to convert the data to structured data.

At Event 630, the structured data retrieved from the backend batch is stored in a centralized database that includes a database view that is generated to populate and filter the most current/latest data retrieved. The data may include, but is not limited to, last-in-time start time, next-in-time start time and, where applicable, the finish time of the last-in-time run. At Event 640, the database is accessed to identify batch processes that failed to meet their predetermined process schedule (i.e., not on schedule). Such identification is based on the last-in-time batch process not being completed/still executing and the next-in-time start time being earlier than the current time. Additionally, the numerical values of the current time and the next-in-time start time are converted to epoch time and the shell scripts are implemented to determine the delay time (defined as the difference between the current time and the next-in-time start time). The conversion of time to epoch value is accomplished in order to present the delay time in units of hours, minutes and seconds.

At Event 650, a report (e.g., electronic mail or the like) is generated that includes a listing of the batch processes/agents that are identified as failing to meet their predetermined processing schedule (i.e., not on schedule) and, optionally, includes a listing or access to the batch processes/agents that are identified as meeting their predetermined processing schedule (i.e., on schedule). Examples of such a report is shown and described in relation to FIG. 5, infra. At Event 660, the listings of batch processes/agents that are identified as failing to meet their predetermined processing schedule (i.e., not on schedule) and batch processes/agents that are identified as meeting their predetermined processing schedule (i.e., on schedule) are hosted on a web server for display of a centralized view of batch process status portal or the like. In addition, the web server may host a historical view for a predetermined period of time (e.g., ninety (90) days or the like) of status data for the backend batch processes, which indicates the on schedule and/or not on schedule performance of batch process over the predetermined period time.

At Event 670, batch processes identified as failing to meet their predetermined processing scheduled are analyzed to determine if the batch process is delayed (i.e., still executing) or hung (i.e., not responding/executing). As previously discussed the determination may be based on the amount of delay time and the interval between runs.

At Event 680, the batch processes identified as failing to meet their predetermined processing scheduled are analyzed to determine a cause for the delayed/hung process and/or one or more corrective actions that can be implemented to alleviate the delayed/hung process. The corrective actions may include, but are not limited to, re-starting the batch process in the event of a hung process, re-assigning the process to a backup database in the event that the primary database in which the process is operating is down or otherwise not functioning properly or the like. At Event 690, at least at portion of the determined corrective actions are executed/Page implemented and, in specific embodiments of the invention the correction actions are executed in automatic response to identifying a batch process as failing to meet their predetermined processing schedule and determining their respective corrective action(s).

Figure 5:
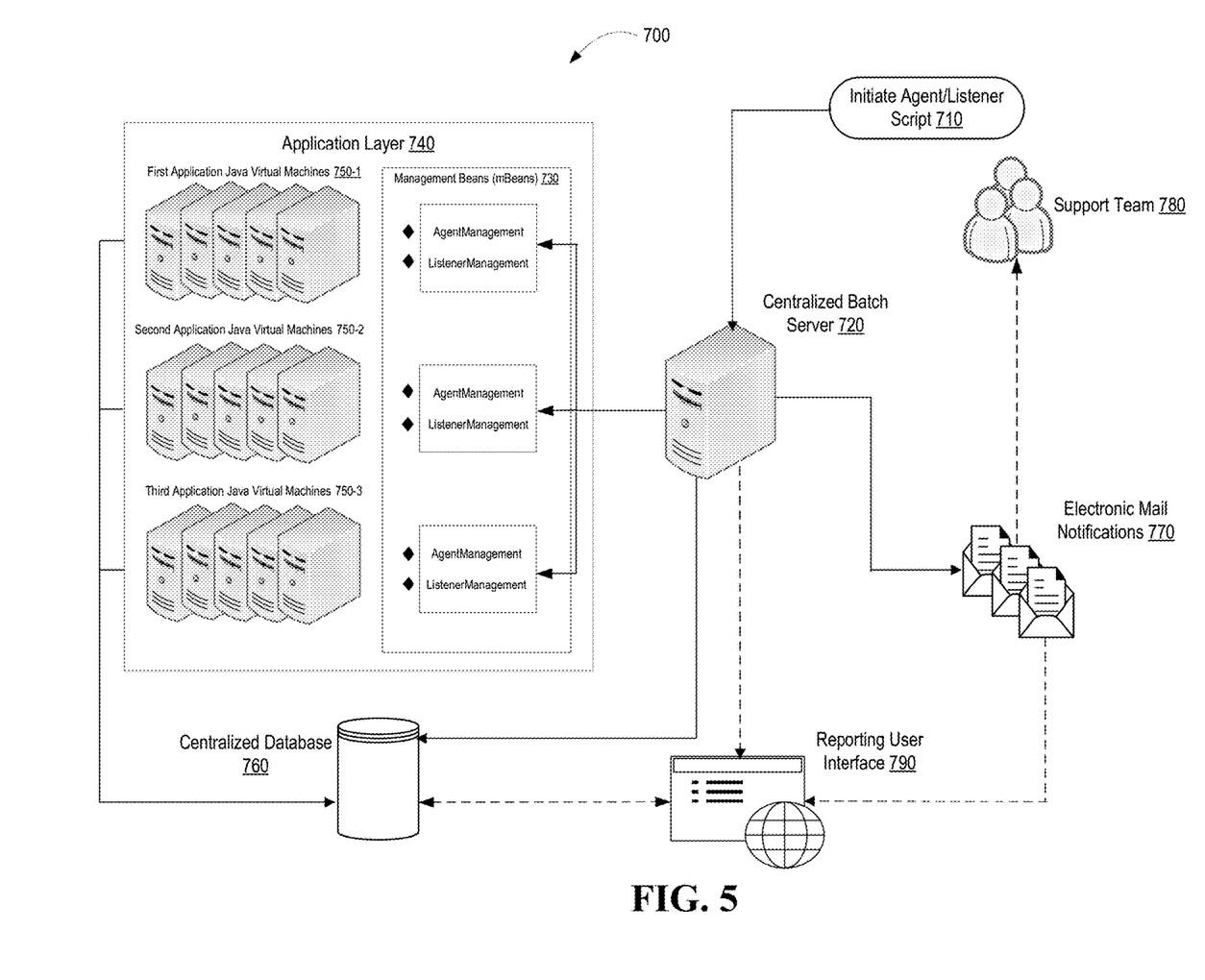
FIG. 5 is a schematic and flow diagram of a system for determining delayed or hung backend processes associated with process management applications, in accordance with embodiments of the present invention.

Referring to FIG. 5 a schematic and flow diagram is presented of a system for determining delayed/hung backend batch processes in accordance with embodiments of the present invention. Initially a scheduling mechanism triggers an agent/listener script 710 to be deployed on a regular schedule (e.g., once every hour or the like). The script is deployed via centralized batch server 720, which establishes a password-less Secure Shell (SSH) tunnel connection across all application virtual machines 750-1, 750-2, 750-3 in the application layer 740. The script 710 is configured to use the management beans (mBeans) embedded in the Java virtual machines to extract agent management and listener management data. For each dull extraction/pull the Java virtual machines 750-1, 750-2, 750-3 establish a Java Database Connectivity (JDBC) connection with centralized database 760 and inserts the data into the database.

The centralized batch server 720 accesses the centralized database 760 to retrieve applicable data, determine batch process status and, where applicable, determine an associated delay period. The batch server 720 implements a reporting mechanism that generates and communicates electronic mail notifications 770 to a plurality of support teams 780. The electronic mail notification includes a hyperlink that provides access to reporting user interface 790. Additionally, the batch server 720 or related storage devices (not shown in FIG. 5) store, as static HTML pages, a predetermined number of days (e.g., 90 or the like) of historical batch process status data that is accessible via the reporting user interface 790. Additionally, the reporting user interface 790 is configured to connect to the centralized database 760 to extract and display current batch process/agent run-time status reports for each instance in which the agent/listener script 710 is deployed.

Figure 6:
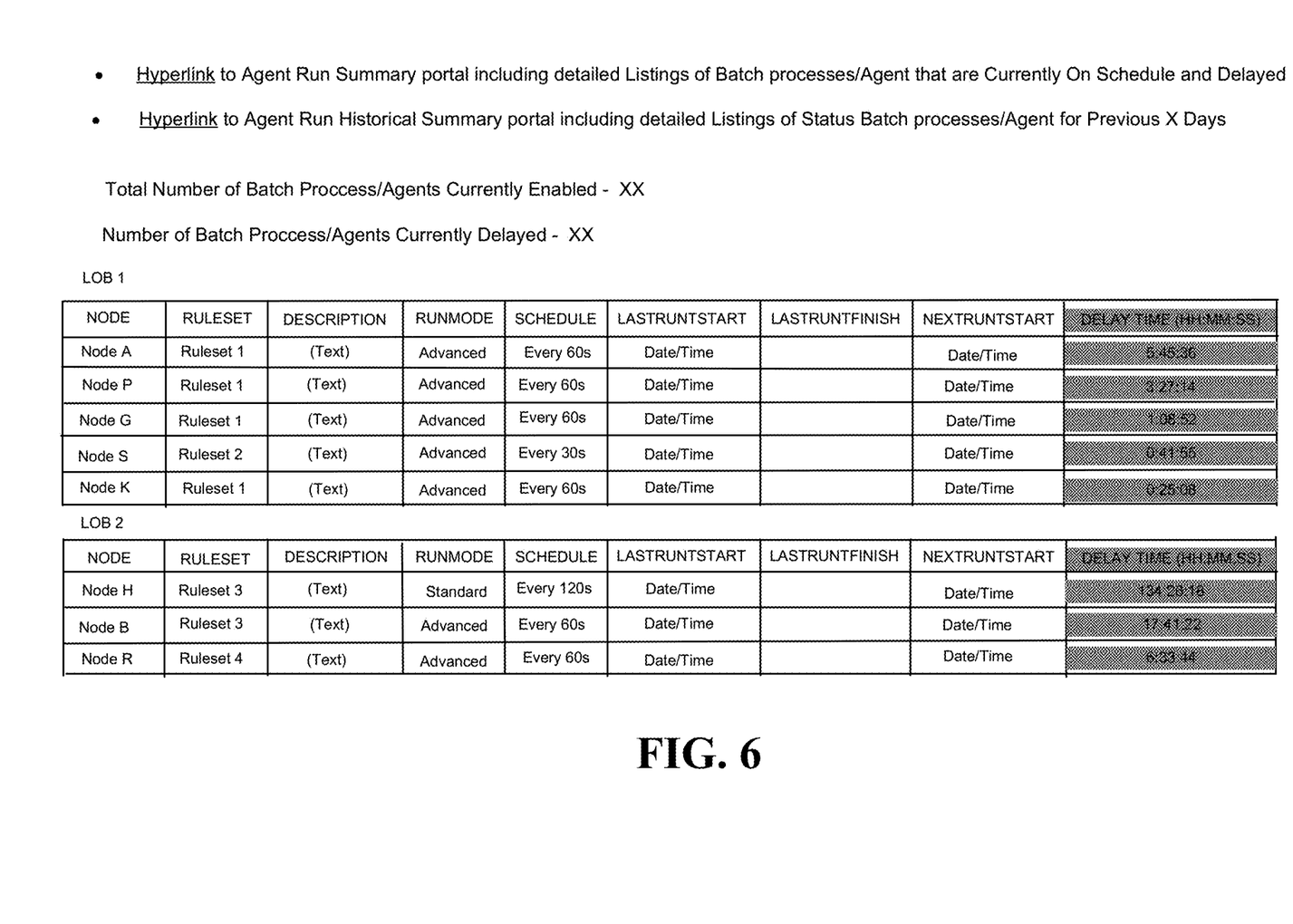
FIG. 6 is an example of a report indicating batch processes that have been determined to currently be delayed, in accordance with embodiments of the present invention.

Referring to FIG. 6 an example is depicted of a report generated to indicate batch processes/agents that have been identified as currently failing to meet their predetermined processing schedule (i.e., not on schedule). The top of the report provides hyperlinks that provide network access to (i) the batch process status portal (i.e., Agent Run Summary portal) that provides detailed listing of both the batch processes/agents that meet their predetermined processing schedule (i.e., on schedule) and the batch processes/agents that fail to meet their predetermined schedule (i.e., delayed) and (ii) a batch process historical status portal (i.e., Agent Run Historical Summary portal) that provides for detailed listings of the status of the batch processes/agents for the previous X number of days (e.g., 60 days, 90 days or the like). Additionally the top of the report includes the total number of batch processes/agents currently enabled/active and the total number of processes agents currently delayed.

The report is configured such that the delayed batch processes are categorized according to line-of-business (LOB). While the example shown depicts two LOBs (i.e., LOB 1 and LOB 2) it will be appreciated that large enterprises will typically comprise many more LOBs, which may in the course of reporting have delayed batch processes/agents.

The report includes columns for node (i.e., the device on which the process/agents is running), ruleset, description of the process/agent, the runmode (i.e., mode of operation of the process/agent) and the schedule (i.e., predetermined processing schedule for running the process/agent). The report additionally includes columns for the lastrunstart (i.e., date and time of last-in-time run), the lastrunfinish (i.e., date and time of the finish of the last-in-time run) and the nextrunstart (i.e., data and time of next-in-time run). Since the reports is inclusive of delayed batch processes agents, the last-in-time run is still executing/running and, therefore, the lastrunfinish column includes blank entries and next-in-time run will indicate a date/time that is the past.

The report additionally includes a delay time in units of hours, minutes and seconds, which is defined as the difference between the current time and the next-in-time run start time (nextrunstart). In the illustrated example shown the batch process/agents are listed, for each LOB, in descending order of the length of the delay period (i.e., the batch process/agent with the longest delay period is listed first).

Thus, present embodiments of the invention provide for monitoring backend batch processes/agents to determine if currently enabled backend batch processes are running/executing on schedule. In the event that currently enabled backend batch processes are determined to be delayed, a delay time is determined. The invention provides for such determinations to made on a regular interval, (e.g., hourly or the like), such that, reports may be generated and communicated and/or a batch process status portal may be updated on the regular interval to reflect the current status of all of the backend batch processes currently enabled within an enterprise. In this regard, the present invention can identify backend batch processes that are currently being delayed so that, identification of the cause(s) for the delay can occur, in some instance in real-time, and corrective action(s) identified and implemented.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for monitoring status of backend batch processes, the system comprising:
 a plurality of backend batch processes, each of the backend batch processes are configured to be executed on a predetermined processing schedule;
 a computing platform including a memory, and at least one processor in communication with the memory, wherein the at least one processor is configured to execute instructions to:
  monitor the plurality of backend batch processes,
  in response to monitoring, store, in a database, data indicating a status of enabled backend batch processes, wherein the data includes a first start time for a last-in-time run and a second start time for a next-in-time run for executing each of the currently enabled backend batch processes, access the database, on a predetermined interval, to identify (a) which currently enabled backend batch processes (i) meet the predetermined processing schedule and (ii) fail to meet the predetermined processing schedule, and (b) at least one currently enabled backend batch process fails to meet the predetermined processing schedule based on (i) the last-in-time run having not been completed, and (ii) the second start time is prior to a current time, determine a current delay period for the at least one currently enabled backend batch process that fails to meet the predetermined processing schedule by converting the second start time for the next-in-time run and the current time to an epoch value and subsequently subtracting the second start time for the next-in-time run from the current time, generate, for the predetermined interval, at least one chosen from the group comprising a report and an update to a batch process status portal, wherein the report and the batch process status portal indicate at least which currently enabled backend batch processes fail to meet the predetermined processing schedule, determine, for the backend batch processes determined to have failed to meet the predetermined processing schedule, one or more corrective actions, and implement at least a portion of the one or more determined corrective actions.

2. The system of claim 1, wherein the instructions configured to generate are further configured to generate the report and the update to the batch process status portal that indicates, for each currently enabled backend batch process, the first state time for the last-in-time run and the second start-time for the a second start time for a next-in-time.

3. The system of claim 1, wherein the instructions configured to generate are further configured to generate the report and the update to the batch process status portal that indicates, for each currently enabled backend batch process that fails to meet the predetermined processing schedule, the current delay period.

4. The system of claim 1, wherein the instructions configured to monitor, store and identify are further configured to:

connect to backend batch processes and use mBeans to retrieve run-time XML, data, convert the XML data into structured data, store the structured data in a relational database, and retrieve, at the predetermined interval, the structured data from the relational database to identify which currently enabled backend batch processes (i) meet the predetermined processing schedule and (ii) fail to meet the predetermined processing schedule and generate the report and the update to the backend process status portal.

5. The system of claim 1, wherein the instructions are further configured to analyze the backend batch processes determined to have failed to meet the predetermined processing schedule to determine whether the backend batch process is a hung process.

6. The system of claim 1, wherein the instructions are further configured to analyze the backend batch processes determined to have failed to meet the predetermined processing schedule to determine a cause for the failure to meet the predetermined processing schedule.

7. A computer-implemented method for monitoring status of backend batch processes, the method is executed by one or more computing processor devices and comprises:

monitoring a plurality of currently enabled backend batch processes;

in response to monitoring, storing, in a database, data indicating a status of enabled backend batch processes, wherein the data includes a first start time for a last-in-time run and a second start time for a next-in-time run for executing each of the currently enabled backend batch processes;

accessing the database, on a predetermined interval, to identify (a) which currently enabled backend batch processes (i) meet the predetermined processing schedule and (ii) fail to meet the predetermined processing schedule, and (b) at least one currently enabled backend batch process fails to meet the predetermined processing schedule based on (i) the last-in-time run having not been completed, and (ii) the second start time is prior to a current time;

determining a current delay period for the at least one currently enabled backend batch process that fails to meet the predetermined processing schedule by converting the second start time for the next-in-time run and the current time to an epoch value and subsequently subtracting the second start time for the next-in-time run from the current time;

generating, for the predetermined interval, at least one chosen from the group comprising a report and an update to a batch process status portal, wherein the report and the batch process status portal indicate at least which currently enabled backend batch processes fail to meet the predetermined processing schedule;

determining, for the backend batch processes determined to have failed to meet the predetermined processing schedule, one or more corrective actions; and implementing at least a portion of the one or more determined corrective actions.

8. The computer-implemented method of claim 7, wherein generating further comprises generating the report and the update to the batch process status portal that indicates, for each currently enabled backend batch process, the first state time for the last-in-time run, the second start-time for the a second start time for a next-in-time and, for each currently enabled backend batch process that fails to meet the predetermined processing schedule, the current delay period.

9. The computer-implemented method of claim 7, further comprising analyzing the backend batch processes determined to have failed to meet the predetermined processing schedule to determine whether the backend batch process is a hung process.

10. The computer-implemented method of claim 7, further comprising:

analyzing currently enabled backend batch processes that have been determined to have failed to meet the predetermined processing schedule to determine a cause for the failure to meet the predetermined processing schedule;

determining one or more corrective actions for addressing the cause; and implementing at least a portion of the one or more determined corrective action.

11. A computer program product comprising:

a non-transitory computer-readable medium comprising:

a first set of codes for causing a computer to monitor a plurality of currently enabled backend batch processes;

a second set of codes for causing a computer to, in response to monitoring, store, in a database, data indicating a status of enabled backend batch processes, wherein the data includes a first start time for a last-in-time run and a second start time for a next-in-time run for executing each of the currently enabled backend batch processes;

a third of codes for causing a computer to access the database, on a predetermined interval, to identify (a) which currently enabled backend batch processes (i) meet the predetermined processing schedule and (ii) fail to meet the predetermined processing schedule, and (b) at least one currently enabled backend batch process fails to meet the predetermined processing schedule based on (i) the last-in-time run having not been completed, and (ii) the second start time is prior to a current time;

a fourth set of codes causing a computer to determine a current delay period for the at least one currently enabled backend batch process that fails to meet the predetermined processing schedule by converting the second start time for the next-in-time run and the current time to an epoch value and subsequently subtracting the second start time for the next-in-time run from the current time;

a fifth set of codes causing a computer to generate, for the predetermined interval, at least one chosen from the group comprising a report and an update to a batch process status portal, wherein the report and the batch process status portal indicate at least which currently enabled backend batch processes fail to meet the predetermined processing schedule;

a sixth set of codes for causing a computer to determine, for the backend batch processes determined to have failed to meet the predetermined processing schedule, one or more corrective actions; and a seventh set of codes for causing a computer to implement at least a portion of the one or more determined corrective actions.

12. The computer program product of claim 11, wherein the fourth set of codes is further configured to generate the report and update to the batch process status portal that indicates, for each currently enabled backend batch process, the first state time for the last-in-time run, the second start-time for the a second start time for a next-in-time and, for each currently enabled backend batch process that fails to meet the predetermined processing schedule, the current delay period.

* * * * *